Sept. 23, 1952     M. DE BAIROS     2,611,302
LIFT TYPE DRAFT UNIT

Original Filed Aug. 12, 1946     2 SHEETS—SHEET 1

INVENTOR
*Manuel De Bairos*

BY
ATTORNEYS

Patented Sept. 23, 1952

2,611,302

UNITED STATES PATENT OFFICE 2,611,302

LIFT TYPE DRAFT UNIT

Manuel De Bairos, Caruthers, Calif.

Continuation of application Serial No. 690,033, August 12, 1946. This application June 21, 1948, Serial No. 34,241

1 Claim. (Cl. 97—47)

This invention is directed to, and it is an object to provide, a novel structure for connecting earth working implements to a wheel tractor in vertically adjustable and draft relation; the structure being relatively simple but rugged, and designed so that maintenance and repair is minimized.

The present application is a continuation, as to all common subject matter, of application, Serial No. 690,033, filed August 12, 1946, now abandoned.

A further object of the invention is to provide an implement lift and draft unit arranged so that the draft is taken on the tractor, by a novel draft assembly, at a point ahead of the rear wheels whereby relatively great power may be applied to the supported, ground engaging tools without any tendency to overturn the tractor rearwardly, but on the contrary the traction thereof is increased.

An additional object of the invention is to provide an implement lift and draft unit, which incorporates a novel lift assembly for causing raising or lowering of the supported tools from or into the ground, such lift assembly being controlled, readily and easily, by the operator from his seat on the tractor.

It is also an object of the invention to provide a novel mechanical arrangement for adjusting the tool bar with respect to the draft arms.

A further object of the invention is to produce a practical implement lift and draft unit, and one which will be exceedingly effective for the purpose for which it is designed.

These objects are accomplished by means of such structure and relative arrangement of parts as will fully appear by a perusal of the following specification and claim.

Figure 1:
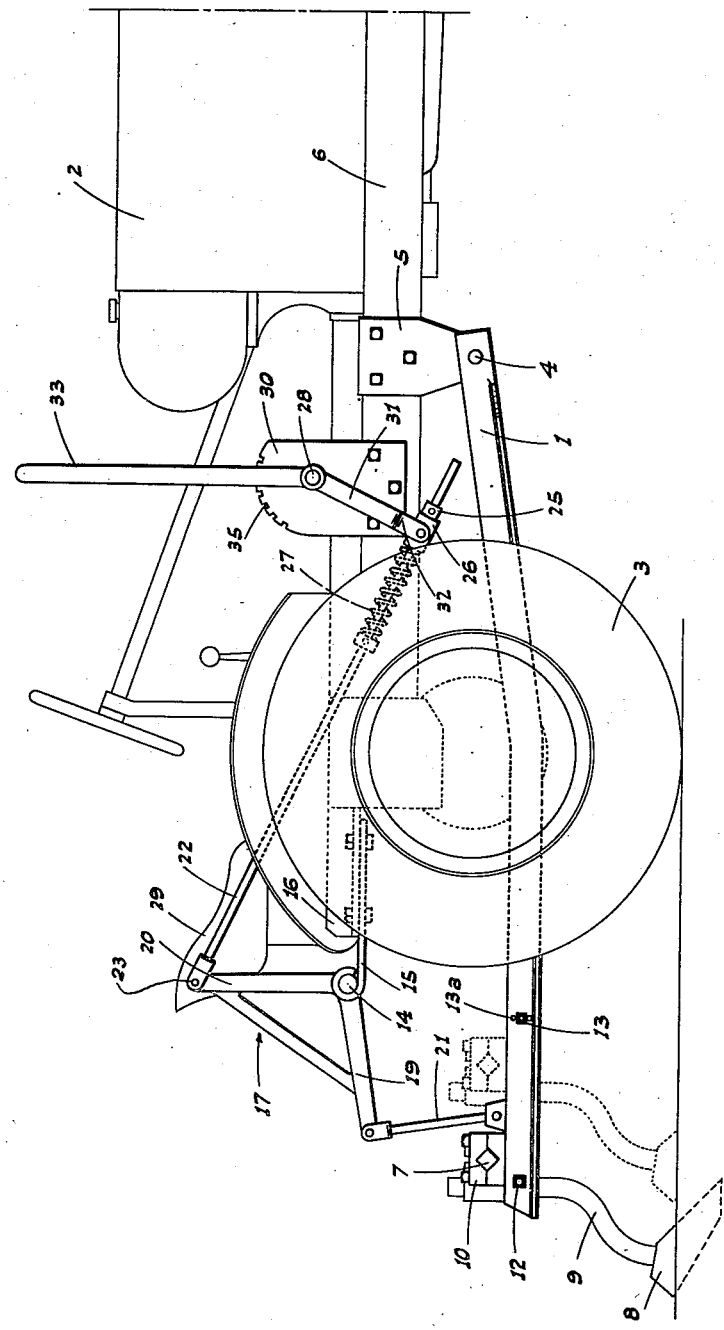
Fig. 1 is a side elevation of a wheel tractor embodying the implement lift and draft unit, with the supported tools lowered into ground working position.
Figure 2:
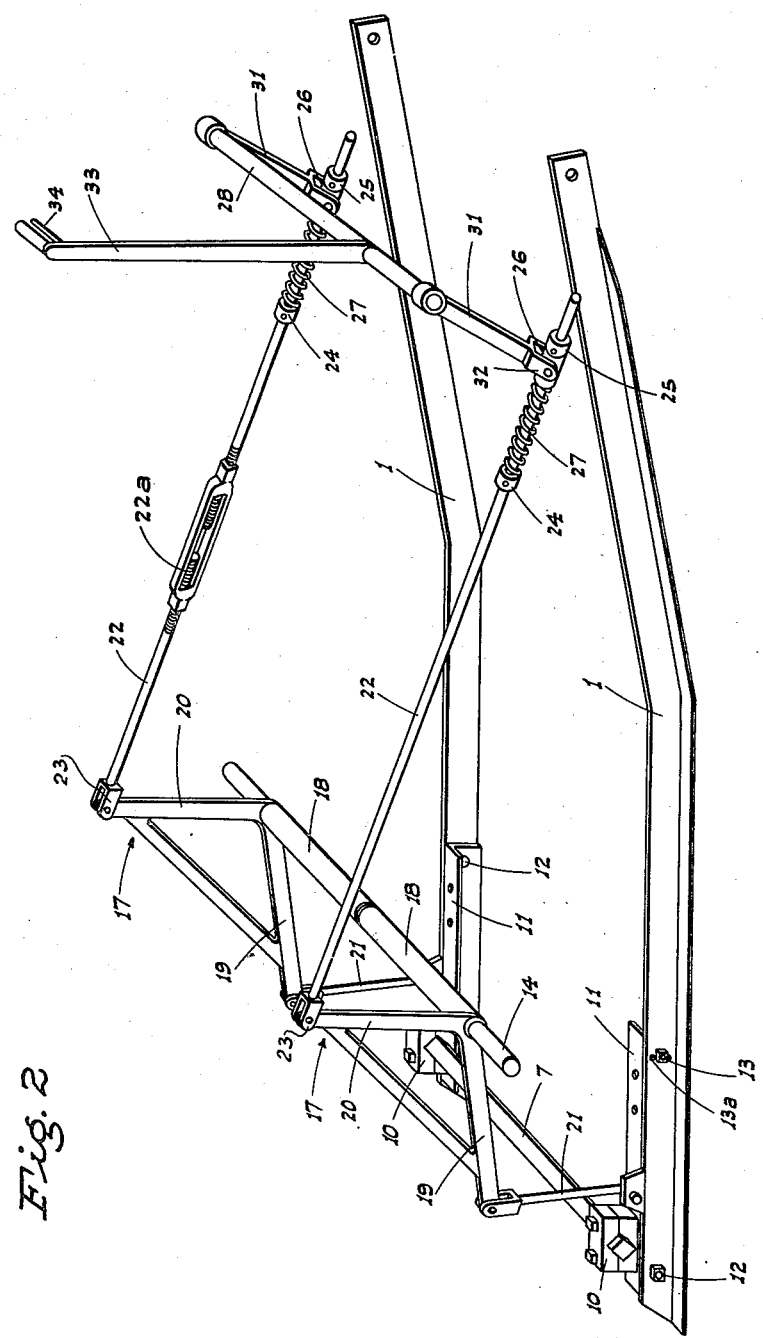
Fig. 2 is an enlarged perspective view of the implement lift and draft unit detached from the tractor.

Referring now more particularly to the characters of reference on the drawings, the implement lift and draft unit comprises a pair of longitudinally extending, transversely spaced draft beams 1 adapted to extend under the rear axle of a wheeled tractor 2 adjacent but laterally inwardly of its rear wheels 3. The forward end portions of the draft beams 1 project some distance ahead of the wheels 3 and are pivotally connected, as at 4, to rigid brackets 5 which are fixed in connection with, and depend from, the side beams 6 of the frame of said tractor.

The forward portion of the draft beams 1 extend from their pivots 4 at a slight downward and rearward slope, while the rear portions are substantially horizontal; said rear portions of the draft beams 1 extending rearwardly of the wheels 3 and being secured in connection with a transversely extending tool bar 7, and ground working tools 8 of any desired type being mounted in connection with the tool bar by means of standards 9.

The following mechanical arrangement is employed to adjustably mount the tool bar 7 in connection with the draft beams 1.

At opposite ends the tool bar 7 is secured in clamping blocks 10 having longitudinally adjustable positions on the laterally inwardly projecting uppermost flanges of corresponding attachment bars 11 of angle iron. These attachment bars 11 lie with their other or depending flanges lengthwise of and flat against the inner sides of the rear portions of the draft beams 1, being secured to the latter by longitudinally spaced bolts 12 and 13. The bolts 12 act as pivots, and the bolts 13 engage selectively through vertically spaced holes 13a. When the bolts 12 are loosened and bolts 13 removed, the arms 11 are vertically swingably adjustable to alter the rotative position of tool bar 7, and consequently the working angle of the tools 8.

By taking the draft of the tractor on the beams 1 at a point some distance ahead of the wheels 3, there is no tendency of the tractor 2 to overturn rearwardly, and the traction thereof is materially improved. The described draft assembly, therefore, is quite advantageous in that relatively great power can be imparted to the tools 8 without difficulty.

The draft assembly, including the beams 1 and associated parts, is vertically adjustable or liftable through the medium of the following lift assembly:

A cross shaft 14 is disposed rearwardly of the tractor above the draft beams 1, but short of the vertical transverse plane of the rear ends thereof; said cross shaft 14 being turnably supported by bearing arms 15 fixed in connection with corresponding rear end portions 16 of the tractor frame.

A pair of diagonally braced bellcranks, indicated generally at 17, are fixed on elongated bearing sleeves 18 turnable on the cross shaft 14, between the bearing arms 15, in adjacent end to end engagement; the bellcranks being thus located in substantially vertical alinement with corresponding ones of the draft beams 1. The bellcranks 17 each include a rearwardly projecting leg 19 and an upwardly projecting leg 20; said bellcranks being arranged in parallelism transversely of the implement.

Suspension links 21 pivotally connect the rear ends of the bellcrank legs 19 and corresponding draft beams 1, whereby rotary motion of said bellcranks is converted into vertical swinging motion of the draft beams 1.

A pair of transversely spaced, longitudinally extending lift control rods 22 are each fitted, at their rear ends, with a clevis 23 pivoted in connection with the upper end of the leg 20 of the corresponding bellcrank 17. From the legs 20 the lift control rods 22 extend at a forward and downward incline adjacent but laterally inwardly of the wheels 3, terminating a short distance ahead of the latter. The lower end portions of the lift control rods 22 are fitted with longitudinally spaced, adjustable stop collars 24 and 25. A sleeve 26 is slidable on each lift control rod 27 between the collars 24 and 25, and a loaded, heavy-duty compression spring 27 surrounds each rod 22 between the collar 24 and sleeve 26, whereby to normally maintain the latter in engagement with the collar 25. This arrangement permits the lift control rods 22 to thrust forward against the compression of springs 27 in the event that the tools 8 strike an obstruction in the ground, while at the same time permits said rods to be mechanically urged in a forward direction, to lift the tools to the inoperative position clear of the ground, by means of the following structural arrangement:

A cross shaft 28 extends above the tractor frame between the side beams 6 ahead of the operator's seat 29. The cross shaft 28 is supported by upstanding plates 30 fixed in connection with the side beams 6.

Parallel, radial levers 31 are fixed on and depend from the ends of the cross shaft 28, and at their lower ends the levers 31 are each fitted with a clevis 32 straddling, and pivotally connected to, the corresponding sleeve 26.

An elongated hand lever 33 is fixed on, and upstands from, the cross shaft 28 adjacent one of the plates 30. The hand lever 33 includes a releasable, spring-pressed latch unit 34 which cooperates with a notched quadrant 35 on said one plate 30, whereby the lever 33 may be latched in any selected position of adjustment.

Upon swinging of the hand lever 33 in a rearward direction, the radial levers 31 swing forwardly, imparting corresponding movement to the lift control rods 22. This in turn rotates the bellcranks 17 in a clockwise direction, lifting the suspension links 21 and the tool bar 7. The operator thus can easily and effectively regulate the depth of penetration of the tools 8 in the ground, or can swing said tools wholly clear of the ground to an inoperative or transport position.

By reason of the independent mounting of each bellcrank 17 on the cross shaft 14, by means of the separately rotatable bearing sleeves 18, a certain floating action of each draft beam 1 is attained without undue strain on the described lift assembly. In other words, when one end or the other of the tool bar 7 is raised above its normal adjusted position, as by the adjacent tools being pushed up by an obstruction or hard soil, the corresponding bellcrank 17 can rotate independently, and the connected rod then works against its spring 27; all without affecting the other bellcrank and rod. This is an advantageous feature, and contributes greatly to the flexibility and effectiveness of the device.

One of the lift control rods 22 has a turnbuckle 22a interposed thereon; adjustment of such turnbuckle being for the purpose of leveling the tool bar 7 whenever necessary.

The draft beams 1 are detachable from the brackets 5 and suspension links 21 so that the assembly of said beams, the tool bar 7, and the supported tools may be readily and quickly removed for replacement of another such assembly carrying a different type of tool.

From the foregoing description it will be readily seen that there has been produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claim.

Having thus described the invention, the following is claimed as new and useful, and upon which Letters Patent are desired:

In an implement lift and draft unit for wheel tractors including a transversely extending tool bar adapted to be disposed to the rear of the tractor, means arranged to mount said tool bar in draft connection with the tractor and for vertical adjustment, and a lift assembly mounted on the tractor and connected to the tool bar; said lift assembly including a cross shaft disposed above the tool bar, transversely spaced bearing arms adapted to mount the cross shaft in connection with the tractor, a pair of transversely spaced bellcranks having bearing sleeves independently rotatably mounted on the cross shaft between the bearing arms, forwardly yieldable links connecting the bellcranks and tool bar, and control means to swing the bellcranks; the bellcranks including elongated bearing sleeves engaging the shaft and together extending from end to end of the shaft between the bellcranks properly spaced transversely and providing elongated bearing areas between the shaft and bellcranks.

MANUEL DE BAIROS.

REFERENCES CITED

The following references are of record in the file of this patent:

UNITED STATES PATENTS

| Number | Name | Date |
|---|---|---|
| 1,754,614 | Cummings | Apr. 15, 1930 |
| 1,871,097 | Trigwell et al. | Aug. 9, 1932 |
| 1,932,112 | Lindgren | Oct. 24, 1933 |
| 2,133,180 | Tuft | Oct. 11, 1938 |
| 2,264,575 | Knapp et al. | Dec. 2, 1941 |
| 2,308,667 | Altgelt | Jan. 19, 1943 |
| 2,357,848 | Ray | Sept. 12, 1944 |
| 2,399,818 | Michael | May 7, 1946 |
| 2,420,530 | Evans | May 13, 1947 |
| 2,546,461 | Lewis | Mar. 27, 1951 |